July 2, 1963  M. A. RADDEMAN  3,096,101
CHART PAPER HOLDER
Filed Dec. 29, 1960  2 Sheets-Sheet 1
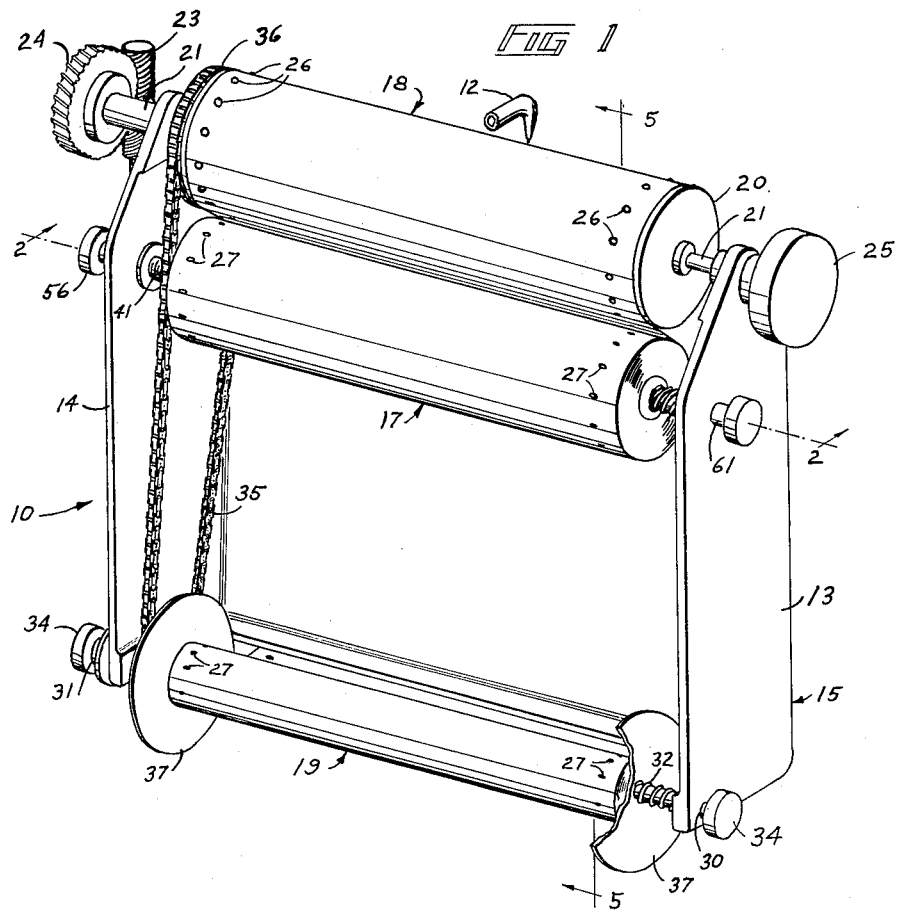
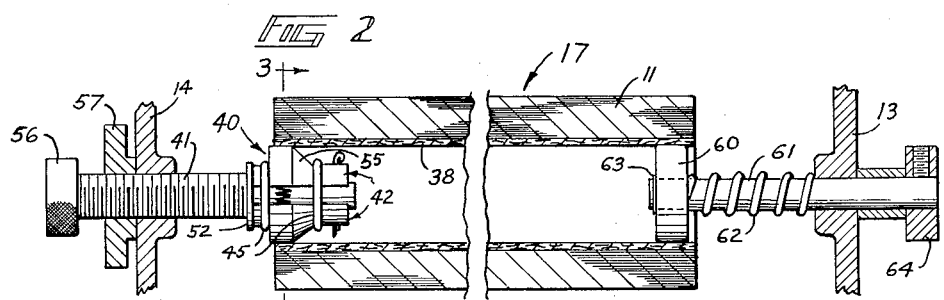
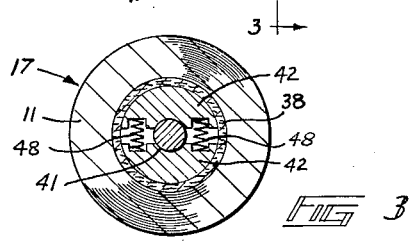
INVENTOR.
MELVIN A. RADDEMAN
BY
ATTORNEYS July 2, 1963
M. A. RADDEMAN
3,096,101
CHART PAPER HOLDER
Filed Dec. 29, 1960
2 Sheets-Sheet 2
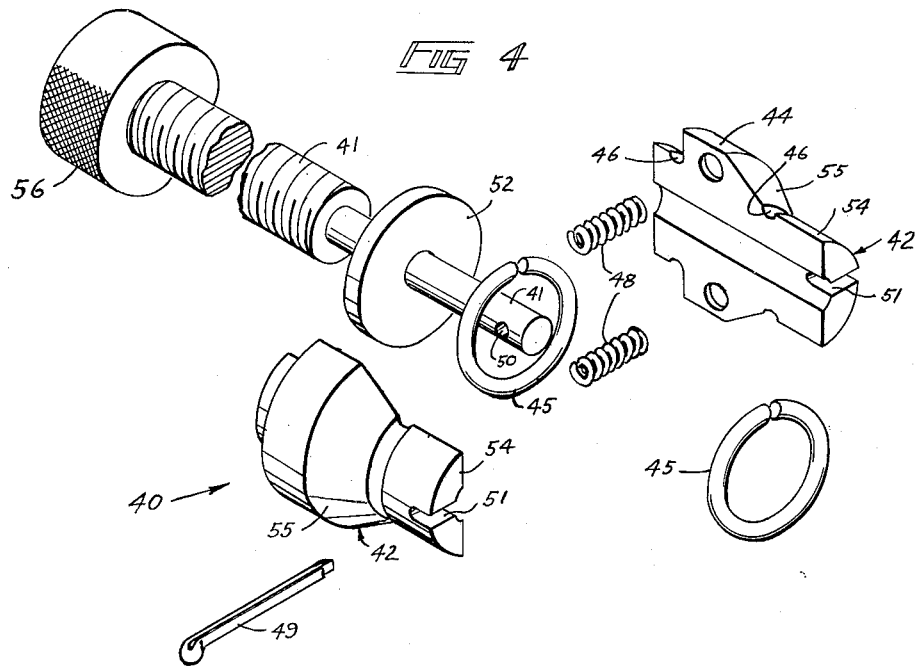
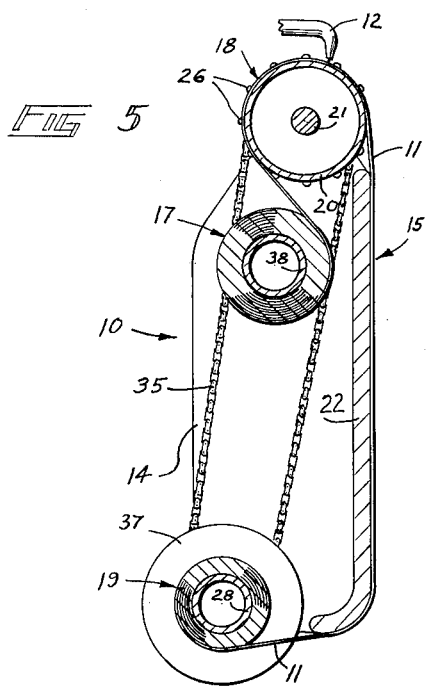
INVENTOR.
MELVIN A. RADDEMAN
BY
ATTORNEYS

United States Patent Office 3,096,101
Patented July 2, 1963

3,096,101
CHART PAPER HOLDER
Melvin A. Raddeman, Rockford, Ill., assignor to Barber-Colman Company, Rockford, Ill., a corporation of Illinois
Filed Dec. 29, 1960, Ser. No. 79,261
3 Claims. (Cl. 281—8)

The present invention relates to chart paper holders for use in instruments for recording the value of a variable condition, and relates more particularly to holders in which the chart paper is drawn by a drive roll from a supply roll and advanced past a stylus contacting the paper and variably positioned in accordance with the value of the condition to make a continuous record of the variations.

The general object of the invention is to provide a novel holder of the above character which insures a uniform and even advance of the paper and which therefore, contributes materially to the accuracy of the recording instrument.

A more specific object is to provide a novel holder of the above character in which the axial position of the supply roll is adjusted automatically to maintain proper alinement of perforations in the chart paper with meshing teeth on the drive roll.

Another object is to mount the supply roll so that the latter keeps the paper taut at all times thereby insuring positive driving engagement between the perforations and the driving teeth.

Other objects and advantages of the invention will become apparent from the following detailed description taken in connection with the accompanying drawings, in which FIGURE 1 is a perspective view of a chart paper holder embodying the present invention.

FIG. 2 is a fragmentary section through the supply roll, taken along the line 2—2 of FIG. 1.

FIG. 3 is a sectional view taken along the line 3—3 in FIG. 2.

FIG. 4 is an exploded perspective view of the supply roll mounting head.

FIG. 5 is a section taken along the line 5—5 in FIG. 1.

For purposes of illustration, the invention is shown in the drawings incorporated in a chart paper holder 10 adapted to move a sheet of chart paper 11 at a uniform rate of advance past a stylus 12 (FIGS. 1 and 5) for making a continuous record of the value of a measured physical condition such as temperature or pressure. The stylus is movable laterally of the direction of advance of the paper in response to the variations of the condition as measured by a sensing unit (not shown) which controls the position of the stylus.

The chart paper holder 10 constructed in accordance with the present invention includes three parallel rolls rotatably supported between spaced parallel sides plates 13 and 14 of a mounting bracket 15. The paper 11 is drawn from a supply roll 17 by a power-driven roll 18, is advanced past the stylus 12, and then is re-rolled on a take-up roll 19.

Mounted above the supply roll 17 is the power-driven roll 18 for drawing the paper from the supply roll and advancing it past the stylus which preferably contacts the paper as the latter passes over the drive roll 18. Herein, the drive roll comprises a cylinder 20 mounted on a shaft 21 journaled adjacent its ends in the side plates 13 and 14 and rotated by a suitable motor (not shown) through a worm 23 meshing with a worm wheel 24 fixed to and encircling one end of the shaft 21. A knob 25 may be fastened to the other end of the shaft to facilitate manual rotation thereof. Around the circumference of the cylinder 20 adjacent each end is a row of angularly spaced, tapered teeth 26 for meshing with uniformly spaced perforations 27 formed along each edge of the chart paper 11. When the chart paper is wrapped over the drive roll 18 and held flat against the cylinder 20 with the teeth 26 projecting through the perforations 27, rotation of the drive roll 18 draws the paper from the supply roll 17.

As the chart paper 11 is drawn from the supply roll 17, it is re-rolled on a power-rotated take-up tube 28 parallelling the drive roll and in this case disposed below the latter. Supporting the take-up tube 28 on the mounting bracket 15 are stubshafts 30 and 31 journaled in the side plates 13 and 14 respectively and projecting inwardly therefrom along a common axis with the inner ends of the shafts telescoping into opposite ends of the take-up tube. The shaft 30 is loosely received in the end of the tube 28 and slidable axially to facilitate removal of the tube when filled. For this purpose, a spring 32 coiled around the shaft urges the latter into the tube 28 and a knob 34 secured to the end of the shaft 30 limits the inward sliding of the shaft. When the shaft 30 is slid out of the tube 28, the filled roll may be removed and replaced with a new tube.

At the other end of the take-up tube 28, the shaft 31 is suitably coupled to the tube and driven with the driven roll 18 through an endless chain 35 running around a sprocket 36 fixed to the end of the drive roll 18 and around a similar sprocket (not shown) on the shaft 31. Flanges 37 formed around the stubshafts 30 and 31, adjacent the inner end of each, abut against the ends of the tube 28 and guide the paper as it is rolled on the tube 28.

With the drive roll 18 mounted above the supply roll 17 and the take-up roll 19 disposed below the drive roll, as shown in FIG. 5, the chart paper 11 may be wrapped around a large part of the circumference of the drive roll so that an optimum number of teeth 26 engage the paper as the drive roll is rotated. Further, the take-up roll 19 re-rolls the paper as the latter leaves the drive roll, thus holding the paper taut to maintain driving engagement between the teeth and the perforations.

The present invention contemplates mounting the supply roll 17 in a novel manner to avoid skewing of the paper caused by misalignment between the teeth 26 and the perforations 27, and to keep the paper taut between the supply roll and the drive roll in order to maintain a uniform advance past the stylus by preventing the teeth from slipping out of the perforations. For these purposes, the means for mounting the supply roll frictionally engages the tube 38 to retard rotation thereof and keep the paper taut at all times. At the same time, the frictional mounting permits the supply roll to shift axially and find its proper position relative to the drive roll 18 whenever the paper is stressed due to misalignment of the teeth and the perforations.

To achieve the foregoing, the supply roll mounting means comprises a radially expansible head 40 which is mounted on a stubshaft 41 threaded into the side plate 14. The head is adapted to telescope into one end of the supply tube 38 and frictionally engage the tube 38 to exert a drag on the supply roll while supporting the roll for sliding axially back and forth as the paper 11 is unrolled. As illustrated in FIGS. 2 and 4, the head 40 comprises a plurality of sections 42, two in this case, disposed around the shaft 41 to form a substantially cylindrical bearing surface 44. The sections 42 are held against radial separation by split rings 45 seated in annular grooves 46 encircling the head 40, and coiled springs 48 compressed between the sections urge the latter toward the expanded position against the rings 45. A cotter pin 49 may be inserted in a hole 50 through the end of the shaft 41 and seated in a slot 51 across the inner end of the head 40 to hold the head against rotation relative to the shaft. The pin also prevents the head from shifting along the shaft and away from a collar 52 on the shaft.

The inner end 54 of the head 40 is of substantially smaller diameter than the opening in the end of the supply tube 38 and the diameter of the cylindrical bearing surface 44, when expanded, is slightly larger than the tube opening. To facilitate entry of the head 40 into the tube 38, the head is formed with a frusto-conical surface 55 connecting the two diameters. This surface 55 guides the head 40 as it enters the tube 38 and is contracted. The head 40 may be moved in or out to obtain the proper initial alignment of the paper 11 by turning a knob 56 to screw the shaft 41 into or out of the side plate 14. A lock nut 57 may be tightened against the plate 14 to maintain the selected position of the shaft 41.

The opposite end of the supply tube may be supported by a roller 60 loosely mounted on a stubshaft 61 and inserted into the tube 38. A light spring 62 coiled around the shaft 61 between the plate 13 and the roller 60 urges the latter into the tube and against a flange 63 around the inner end of the shaft 61. Mounted in this manner, resistance of the roller to axial shifting of the supply roll is negligible.

To facilitate removal of an exhausted supply tube and insertion of a new roll, the stubshaft 61 may be slidably mounted in the plate 13 with a knob 64 attached to the outer end of the shaft 61. Thus, when the shaft 61 is shifted axially out of the tube 38, the roller is withdrawn and the tube 38 may be pulled off the head 40. After a new roll is installed, the knob 64 is released and the spring 62 urges the roller 60 back into the new tube.

It will be apparent that a holder constructed in accordance with the present invention avoids inaccuracies in recording which result from improper alignment of the chart paper or from over-running of the drive roll by the supply roll. The frictional drag exerted by the expansible head maintains tautness between the supply and the drive, while the same mounting permits the supply roll to shift axially back and forth to find its proper position relative to the drive roll in response to the coaction of the perforations in the paper and the teeth on the drive roll.

I claim as my invention:

1. In a holder for an elongated sheet of chart paper rolled on a supply tube and having a series of longitudinally spaced perforations therein, the combination of, a support, a shaft fixed at one end to said support, a radially expansible head comprising a plurality of sections disposed around said shaft to form a substantially cylindrical bearing surface insertable into one end of the supply tube, a second shaft mounted on said support and telescoping into the other end of the tube, a roller telescopingly snugly into the other end of the tube and mounted on said second shaft both for rotation thereon and for axial sliding, said roller and said head supporting the tube for rotation about a fixed axis, a power-driven roll mounted on said support for rotation about an axis paralleling said tube axis, a series of teeth angularly spaced around said roll to mesh with the perforations in the paper and draw the latter from the tube as the roll is rotated in one direction, and spring means disposed between said sections and urging the latter into light frictional engagement with the tube thereby to exert a frictional drag on the tube while permitting back and forth axial shifting thereof to maintain proper alinement of said teeth and the perforations as the paper is drawn from the tube.

2. In a holder for an elongated sheet of chart paper rolled on a supply tube and having a series of longitudinally spaced perforations therein, the combination of, a support, a power-driven roll mounted on said support for rotation about a fixed axis, a shaft fixed at one end to said support and paralleling said roll axis, a radially expansible head on the free end portion of said shaft comprising a plurality of sections disposed around the shaft to form a substantially cylindrical outer surface telescoping into one end of the supply tube, a series of teeth angularly spaced around said roll to mesh with the perforations in the paper and draw the latter from the tube as the roll is rotated in one direction, and spring means disposed between said sections and urging the latter into light frictional contact with the tube to exert a frictional drag thereon while permitting axial shifting of the tube back and forth relative to said roll in response to stresses in the paper exerting axial forces on the tube greater than the light frictional force exerted by said spring means.

3. In a holder for an elongated sheet of chart paper rolled on a supply tube and having a series of longitudinally spaced perforations therein, the combination of, a support, a drive roll mounted on said support for rotation about a fixed axis, a member mounted on said support for endwise insertion into one end of the tube and expandable within the tube to engage and support the latter for rotation about an axis paralleling said roll axis, a series of teeth on said roll angularly spaced apart to mesh with the perforations in the paper, means for rotating said roll in a direction to draw the paper from the tube and thereby rotate the tube, said member being held against rotation with the tube, and spring means for expanding said member into light frictional engagement with the tube to exert a frictional drag thereon and maintain the paper taut while permitting the tube to shift axially relative to said member and said roll in response to lateral stresses in the paper resulting from axial misalinement of the teeth and the perforations thereby to correct such misalinement.

References Cited in the file of this patent

UNITED STATES PATENTS

| | | |
|---|---|---|
| 1,402,060 | Fisher | Jan. 3, 1922 |
| 2,296,613 | Gustavson | Sept. 22, 1942 |